Patented May 13, 1924.

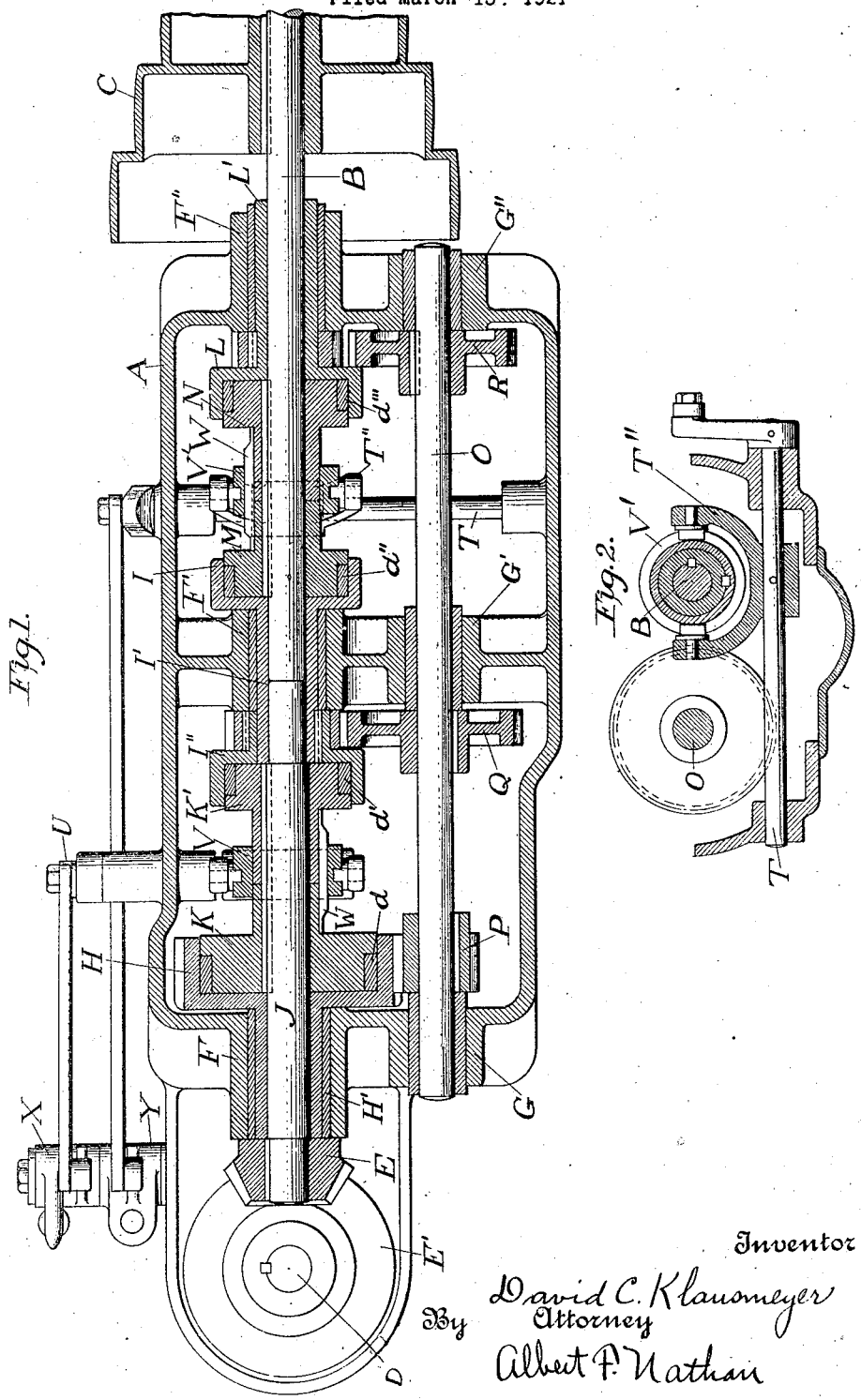

1,494,323

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

COMPACTED GEAR.

Application filed March 15, 1921. Serial No. 452,559.

*To all whom it may concern:*

Be it known that I, DAVID C. KLAUSMEYER, a citizen of the United States, and residing at Cincinnati, in the county of Hamilton and State of Ohio, have invented new and Improved Compacted Gears, of which the following specification is a full disclosure.

This invention relates to improvements in machine tools and has more special reference to a mechanism for imparting to a driven element either a forward or reverse movement at either a slow or fast rate of speed.

The present invention is a modification of the invention disclosed in a copending application filed by this applicant on August 25th, 1920, Serial No. 406,008. In the copending application a construction is exemplified comprising a clutch member adapted to cooperate with a clutch member arranged on an auxiliary shaft to effect the actuation of the auxiliary shaft. In the present construction the clutch for effecting an actuation of the auxiliary shaft is actuated by the same clutch locking mechanism used in controlling one of the clutches for actuating a direct drive shaft. The present construction is therefore simpler and more compact than that described in the copending application above indicated, some of the elements being eliminated without decreasing the possible variations in speed or direction.

Other objects and advantages will be in part indicated in the following description and in part rendered apparent therefrom when taken in connection with the annexed drawing.

To enable others skilled in the art to understand the underlying features of the invention so that they may embody them in the various ways contemplated, a drawing showing a preferred typical construction is annexed as part of this disclosure.

In said drawing: Fig. I is a horizontal section of the invention and Fig. II is a section on the line 2—2 of Fig. I.

The directional and speed change operating elements are conveniently arranged within a suitable casing A which is secured to any desired portion of the machine tool with which the transmission structure is to be used. A forward drive shaft B is partly located within the casing A and partly projects beyond one end thereof, the projecting end being provided with a cone pulley C keyed thereto and having any convenient number of steps as shown, for the purpose of affording a variety of initial belt drive speeds. The power received from the belting and imparted to the shaft B is ultimately delivered to any suitable mechanical element as for example a shaft or spindle D which is in driving relation with a bevelled gear E and which may be considered as constituting the terminal element of the transmission structure. Between the shaft B and the beveled gear E, either of which may be regarded as the driving element, is the speed and direction change mechanism, which is more particularly the subject of the present invention. The casing A is preferably provided with a group of three co-axially aligned journal boxes F, F' and F'', adapted to support a plurality of forward driving shafts and a second group consisting of three additional journal boxes G, G' and G'', also co-axially aligned and adapted to support an auxiliary or reversing shaft. Each of these journal boxes contains a suitable bearing of anti-friction metal. A clutch member H provided with a sleeve H' is journalled in a box F and a clutch member I provided with a sleeve I' is journalled in the box F'. The sleeve H' constitutes a bearing for a shaft J which projects through one end of the casing A, the projecting end having the bevelled gear E keyed thereto. One part of the sleeve I' constitutes a bearing for the end of the shaft J opposite to that carrying the bevelled gear E and the other part constitutes a bearing for the end of the shaft B opposite to that carrying cone pulley C. A geared clutch member I'' is keyed to the sleeve I' of the clutch member I and has one end abutting against the journal box F', whereby longitudinal movement of the sleeve I' with respect to the journal box F' is conveniently prevented. Contiguously located clutch members K and K' are keyed to the shaft J and are each provided with expansible elements arranged to cooperate with the clutch members H and I'' respectively. A geared clutch member L is journalled in the journal box F'' and is provided with a sleeve L', the latter constituting a bearing for an intermediate portion of the shaft B. The clutch members I and L may be and preferably are spaced from each other and cooperate with clutch members M and N each provided with expansible elements respectively. The clutch members K and K' are keyed to the shaft J and the clutch members M and N are keyed to the shaft B, the clutch members rotating with their respective shafts or causing the shafts to rotate therewith when actuated. An auxiliary shaft O is carried in the journal boxes G, G' and G'' and has keyed thereto a pinion P, permanently in mesh with the geared clutch member H. The shaft O is also provided with a gear Q which is in mesh with the geared clutch member I''; and with a gear R. The gear R and the clutch member L are each in mesh with an idler (not shown), so that when the gear L is locked to the shaft B by the operation of member N, the pinion P and the gears Q and R, together with the shaft O, are concurrently rotated with shaft B thereby rotating either of the geared clutch members H and I'' in a reverse direction, and transmitting reverse rotational movement to the shaft J depending on which of these geared clutch members is locked to the shaft.

To obtain the various speeds and directions the clutches operated by shafts T and U are appropriately set, it being understood that the shaft T controls a clutch organization for affording either a forward or reverse drive and the shaft U controls a clutch organization for varying the rate of speed as between the driving and the driven member. To effect the control just mentioned, the shaft T is provided with a yoke member T'' controlling the position of the collar V', which in turn determines the position of double acting wedge bar W'. This wedge bar expands either the friction bands $d''$ or $d'''$, (depending upon the direction in which the collar is moved) against the inner surfaces of the annular clutch parts I and L. The shaft U is provided with a yoke which controls the position of the collar V which in turn determines the position of the collar V which in turn determines the position of wedge bar W. The wedge bar W expands either the friction bands $d$ or $d'$ against the inner surfaces of the clutch members H and I'', depending on the direction in which the collar is moved.

This wedge bar arrangement for expanding friction bands is of the type disclosed in the Norris Patent No. 1,030,424, and the specific type of friction clutch does not form part of the present invention. When the shaft T is turned right handed, as viewed from the front in Fig. I, the clutch mechanism establishes a driving relation between the geared clutch member L and the expansible clutch part N thereby causing the clutch member L to rotate in the same direction and at the same speed as the shaft B and when the shaft is turned left handed, the driving relation between the clutch parts M and I'' is established. If the shaft T is turned toward the right, the auxiliary shaft O is locked to shaft B and when the shaft T is turned left handed the geared clutch member I'' is locked to the shaft B. When the shaft U is turned clockwise (as viewed from the front in Fig. I), a driving relation is established between the clutch part I'' and the clutch element K'. Since the element K' is keyed to the shaft J, the latter is caused to rotate in the same direction and at the same speed as the element I or shaft B. If the shaft U is turned counter-clockwise the clutch parts K and H are engaged and the clutch parts I'' and K' are disengaged. In this position the shaft J is geared to the shaft O. If the shaft U is turned in such position as to engage the parts I'' and K' and the shaft T turned to such position as to engage parts I and M, the shaft J is driven in the same direction and at the same speed as the shaft B, and a direct drive is established between these parts without necessitating gears to transmit the power.

If it is however desired to obtain a slower drive speed in a forward direction than that indicated above, it is only necessary to turn the shaft U in a left handed direction so as to cause the disengagement of the friction band $d'$ from its associated clutch member I''. This turning of the shaft U concurrently causes the friction band $d$ to lock the gear I to the clutch element K' so that the power will now be transmitted through the gear I'' to the gear Q, shaft O and pinion P. The pinion P being in mesh with the larger gear H, the power will be transmitted at a reduced rate to the shaft J and ultimately to the driven member D. The ratios of the gears I'' to Q and P to H will determine the relative speed of the driven element with respect to the driving element. It is to be noted that the sleeve I' is a power transmitting element for the direct drive whether at a fast or slow rate of speed; whereas in case of a reverse drive, the gears L and R are the power transmitting elements for either a slow or fast drive. To effect a reverse movement of the driven element D with respect to the driving member C, the shaft T is moved in a clockwise direction thereby causing the geared clutch member L to be locked to the clutch member N and to the shaft B, as has already been indicated. The power is thereby transmitted from this shaft O through an idler and gear R. From the shaft O, the power is transmitted to the shaft J from either the elements H or I'', depending upon which one is engaged—the element H for a slow drive and the element I'' for a fast drive. For the purpose of operating the shafts U and T any suitable mechanism may be employed. In the illustrated example associated bell cranks X and Y are pivoted to the side of the casing and are connected to the shafts U and T respectively by links $x$ and $y$.

Having thus revealed this invention, I claim as new and desire to secure the following combinations of steps and elements, or equivalents thereof, by Letters Patent of the United States:

1. A speed-and-direction change-mechanism combining a driving shaft; a driven shaft arranged co-axially with said driving shaft; a third shaft parallel with said driving and driven shafts; three gears non-translatably secured to said third shaft; two non-translatable direction-controlling friction clutches carried by said driving shaft; two non-translatable speed-controlling friction clutches carried by said driven shaft; a gear carried by one of said direction-controlling clutches; a gear carried by each of said speed-controlling clutches and each permanently meshing with one of the gears on said third shaft; a reversing gear permanently connecting the gear on said direction-controlling clutch with the third gear on said third shaft; a first clutch-operating device adapted to control both of said speed controlling clutches; and a second clutch operating device adapted to control both of said direction-controlling clutches; said gears and controlling clutches being constructed and arranged selectively to rotate said driven shaft at relatively slow and fast rates in both forward and reverse directions, said slow and fast rates being equal in both directions of rotation.

2. A speed-and-direction change-mechanism combining seven gears and three shafts, two of said shafts being coaxial and the third shaft being parallel therewith, three of said gears being arranged as a reversing train between one of said coaxial shafts and one end of said parallel shaft, and the remaining four of said gears being arranged as two non-reversing trains between the other of said coaxial shafts and the other end of said parallel shaft, clutch mechanism adapted either to connect said two coaxial shafts or to render operative said reversing train, clutch mechanism independently adapted to render either of said non-reversing trains operative, a first clutch-operating lever adapted solely to change the direction of motion without changing its rate; and a second clutch-operating lever adapted solely to vary the rate of the motion without changing its direction.

3. A speed-and-direction change-mechanism combining a shaft B; a shaft J arranged co-axially with the shaft B; a first gear I'' loose on one end of the shaft J; a clutch $d'$ for affixing said first gear to said shaft J; a second clutch $d''$ for affixing said first gear to the shaft B; a third shaft O parallel with said shafts B and J; three gears P, Q and R on said third shaft, the gear Q meshing with said gear I''; a second gear H on said shaft J, meshing with the gear P; a gear L on the shaft B; an idler gear connecting said gear L with the gear R; a third clutch $d'''$ for rendering said idler gear, the gear L and the gear R effective to transmit motion from said shaft B to said third shaft; and a fourth clutch $d$ for enabling said third shaft to drive said shaft J through the gear H thereon, the first and fourth, and the second and third clutches being arranged to be operative only one at a time, respectively; a first clutch-operating lever adapted solely to change the direction of motion without changing its rate; and a second clutch-operating lever adapted solely to vary the rate without changing its direction.

4. A speed-and-direction change-mechanism combining two pairs and a trio of permanently-meshing differently-ratioed gears, the end-gears being centered on two parallel axes, respectively; a driving and a driven shaft; a direction-controlling clutch $d''$ for connecting the driving shaft to one of the gears of one of said pairs; a second clutch $d'$ for connecting the same gear to the driven shaft whereby said two shafts will rotate as a unit; a third clutch $d$ cooperating with said clutch $d''$ for establishing a slower driving connection from said driving shaft through said two pairs of gears to said driven shaft; and a fourth clutch $d'''$ for establishing a driving connection from said driving shaft, through said trio to both of said pairs of gears in a reverse direction; and means for selectively engaging either of the clutches $d$ or $d'$ to transmit to said driven shaft reverse rotation at either a low or a high rate, respectively, said first and fourth, and second and third clutches, respectively, being so related as to be effective only one at a time.

In witness whereof, I hereunto subscribe my name, as attested by the two subscribing witnesses.

DAVID C. KLAUSMEYER.

Witnesses:
Aug. H. Frechter,
C. C. Slete.